Figure 1:
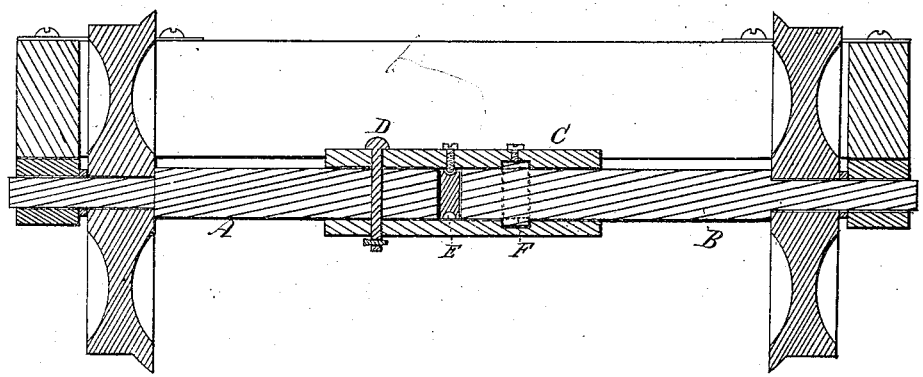

H. H. RHODES.
Railway Car Axles.

No. 153,203.

Patented July 21, 1874.

Witnesses,

Josiah C. Tuck.
John H. Redstone.

Inventor

Henry H. Rhodes

UNITED STATES PATENT OFFICE.

HENRY H. RHODES, OF APTOS, CALIFORNIA.

IMPROVEMENT IN RAILWAY-CAR AXLES.

Specification forming part of Letters Patent No. 153,203, dated July 21, 1874; application filed September 25, 1873.

*To all whom it may concern:*

Be it known that I, HENRY H. RHODES, of Aptos, in the county of Santa Cruz and State of California, have invented an Improvement in Car-Axles, of which the following is a specification:

The object of my invention is to construct a car-axle which shall combine the advantages of the solid axle, having wheels fixed by solid attachment, with those of the axle where the wheels are allowed to revolve independently, thus overcoming the objections to the solid attachment of the wheel and axle, while securing all the advantages of the same.

The invention will be fully understood by reference to the accompanying drawing, in which—

Figure 1 is an elevation, showing two car-wheels attached to the axle, with a longitudinal section cut out to show the construction and arrangement of the coupling.

In Fig. 1, A and B represent the two parts of the axle; C, the sleeve upon the same; D, the rivet or bolt for attaching the sleeve firmly to the axle A. The die E has a concentric oil-groove, and is designed to serve as an oil-plate and bearing for the ends of the axle to operate against. F is a ring of suitable metal, which may be formed by pouring when melted and attaching to the shaft and filling a groove, which is formed in the sleeve to receive the same, and in which it is designed to revolve.

The following is the manner of constructing my invention, as I have perfected the same, as shown in Fig. 1: The sleeve C is shrunk on or otherwise solidly attached to the axle A, as shown by the bolt D. The long end of the axle B revolves freely in the sleeve C, and is held in place by means of the metallic ring F, which operates in the groove cut to receive the same in the sleeve C. It is attached to the axle by drilling shallow holes or producing other indentations or irregularities in the shaft, or employing any well-known means, which may be employed to secure adhesion.

The following is the operation of the axle: As the car moves forward in a straight line the wheels revolve equally, but when the track curves, the wheel upon the outer rail, or that describing the greatest curve, is required to revolve faster than the one upon the inner rail. To effect this I have constructed the compound axle A and B to operate in the sleeve C, the short part of the axle being made fast to the sleeve C, and the long part B being allowed to revolve freely in the sleeve C. The metallic ring F holds the axle firmly against the steel oil-plate, the groove in the same forming a large oil-space, while the faces of the same are left the full size of the shaft, which revolves upon the same in case of an unequal motion of the wheels. Thus, by means of the sleeve C having a long bearing and being closely fitted to the axle, and from the fact that the axle is held firmly against the steel oil-plate and bearing E, the full advantages of the solid car-wheel and axle are retained, while the great disadvantages of the same are overcome, especially that of the slipping of one of the wheels, as is necessarily the case where the solid wheel and axle are used.

The advantages of this arrangement are seen in the durability and compactness of its construction, and in the facility and cheapness with which it may be constructed, and in the superior mode of supplying the oil by means of the steel oil-plate and bearing E.

It will be seen that the great advantage claimed for the solid wheel and axle—that it forms a great part of the strength of the car, in that frame of the same is held from spreading—is fully maintained by the use of this device, which holds the axle firmly together.

What I claim as my invention, and desire to secure by Letters Patent, is—

The combination of the grooved sleeve C, the sections of the axle A and B, and the ring F, molded in place, as set forth.

HENRY H. RHODES.

Witnesses:
JOSIAH C. TUCK,
JOHN H. REDSTONE.